United States Patent [19]

Almond et al.

[11] Patent Number: 4,987,570
[45] Date of Patent: Jan. 22, 1991

[54] METHODS AND APPARATUS FOR PERFORMING TIME INTERLEAVED MULTIPLEXED RATE ADAPTATION FOR SUB-RATE CHANNELS IN A DIGITAL DATA COMMUNICATION SYSTEM

[75] Inventors: Gary R. Almond, Frederick; David W. Storey, Dickerson, both of Md.

[73] Assignee: Data General Corporation, Westboro, Mass.

[21] Appl. No.: 308,354

[22] Filed: Feb. 9, 1989

[51] Int. Cl.⁵ .............................................. H04J 3/07
[52] U.S. Cl. ...................................... 370/84; 370/112; 370/99
[58] Field of Search ..................... 370/84, 112, 79, 58, 370/85, 111, 95.1, 99

[56] References Cited

U.S. PATENT DOCUMENTS

| | | | |
|---|---|---|---|
| 3,982,077 | 9/1976 | Clark et al. | 370/84 |
| 4,547,877 | 10/1985 | Lehman et al. | 370/84 |
| 4,617,658 | 10/1986 | Walters | 370/84 |
| 4,658,152 | 4/1987 | Walters | 370/84 |
| 4,759,018 | 7/1988 | Buchner | 370/112 |
| 4,771,420 | 9/1988 | Deschaine et al. | 370/58 |
| 4,852,089 | 7/1989 | Berry et al. | 370/95.1 |

Primary Examiner—Douglas W. Olms
Assistant Examiner—Min Jung
Attorney, Agent, or Firm—Joseph J. Kaliko; Joel Wall

[57] ABSTRACT

Methods and apparatus are set forth which improved the sub-rate channel carrying capacity and the efficiency of bandwidth usage, over the CCITT I.463 standard, for switching systems having a switching "granularity", defined as the smallest channel size that can be switched through the system, of better then 64 Kbps (e.g. a switching system that can switch 8 Kbps fragments). These methods and apparatus are capable of performing rate adaptation for multiple synchronized subrate channels in accordance with a predefined multiplexing protocol. The protocol calls for "time interleaved" multiplexed rate adaptation to be performed, i.e., multiple sub-rate channel data is packaged into fragment size envelopes (or integer multiples thereof). The width of a fragment is also matched (ideally equal) to the granularity of the system's switch. As a result of using the time interleaved multiplexed rate adaptation scheme, the rate adaptation process, the channel carrying capacity of the system at large, and the use of the system's switching and bandwidth capacity are all improved.

12 Claims, 3 Drawing Sheets

○ = NODE

METHODS AND APPARATUS FOR PERFORMING TIME INTERLEAVED MULTIPLEXED RATE ADAPTATION FOR SUB-RATE CHANNELS IN A DIGITAL DATA COMMUNICATION SYSTEM

BACKGROUND OF THE INVENTION

1. Field of the Invention

This invention pertains to digital data communication systems and more particularly relates to methods and apparatus for performing time interleaved multiplexed rate adaptation for sub-rate channels in order to improve the system's individual channel carrying capacity and thereby take maximum advantage of both the system's switching "granularity", defined hereinafter as the smallest channel size that can be switched through the system, and available bandwidth.

2. Description of the Prior Art

State of the art digital data communication switching systems are typified by the systems described in copending patent application Ser. No. 07/103,611, filed Oct. 1, 1987, entitled "High Speed Communication Processing System", and 07/103,612, also filed Oct. 1, 1987, entitled "A Digital Data Communications System". Both of these applications, hereby incorporated by reference, are assigned to the same assignee as this invention.

The system taught in the Ser. No. 07/103,612 application is defined as having m slots of data per frame and n fragments per slot to yield a total of m×n fragments per frame.

For example, the invention taught in the 07/103,612 application permits a T1 line to be divided up into 24 slots, each 64 Kbps wide, with 8 fragments being defined per slot (each representing 8 Kbps bandwidth). This yields 192 fragments with an 8 Kbps signalling channel left on the T1 line. Also, bandwidth allocation is contemplated for 2.048 Mbps Inter Module Links ("IMLs") within a given node, where 32 slots each 64 Kbps wide can be defined (each again with eight 8 Kbps fragments).

Also taught in the referenced applications are means for allocating and deallocating bandwidth on the communication lines of the system using bit maps, how to perform allocation in a manner which minimizes call blocking, contention, etc., and how to interconnect Customer Premise Equipment (CPE) to the node oriented network via User Interfaces (UI), Network Processors (NPs), Switch Matrices (SMs), Network Interfaces (NIs), etc., via the IMLs in a given node.

The systems taught in the referenced applications support the CCITT I.463 standard for multiplexing of sub-rate channels. Also, these systems have the capability of switching fragment vs. slot packets, i.e., have an improved switching granularity as compared with the 64 Kbps switch granularity to which the I.463 standard was designed.

For the illustrative 32 slot, 8 fragments per slot IML bandwidth scheme set forth hereinbefore, I.463 mandates that sub-rate channels (defined herein as a 19.2 Kbps channel or any submultiple thereof) be assigned to 64 Kbps of bandwidth (a whole slot) before being transmitted to the switch. According to the I.463 standard, two layers of rate adaptation are performed to condition sub-rate channel data to be transmitted in the 64 Kbps packets.

Given the improved switching granularity and bandwidth allocation capabilities of state of the art systems, such as those set forth in the referenced copending patent applications, it was an object of copending patent application Ser. No. 07/308,705, filed on Feb. 9, 1989, entitled "Methods and Apparatus For Multiplexing Sub-Rate Channels In A Digital Data Communication System", assigned to the same assignee as this invention, to improve the efficiency of bandwidth usage over the I.463 standard for sub-rate channel bandwidth allocation. This copending application is hereinafter referred to as the "Improved I.463 Patent Application". It was also an object of the Improved I.463 Patent Application to be able to fully use the switching capabilities (granularity) of the communication system. Since the inventions taught in the incorporated patent applications made it possible to switch fragments of less then 64 Kbps, it was recognized that it would be desirable if sub-rate channel assignments were keyed to the granularity of the switch which in turn could be ideally matched to the choice of fragment size.

Patent Application Ser. No. 07/308,705, filed Feb. 9, 1989, is also hereby incorporated by reference.

In short, the Improved I.463 Patent Application, describes how to improve the efficiency of bandwidth usage over the CCITT I.463 standard, for switching systems having a granularity of better then 64 Kbps (e.g. 8 Kbps).

The efficiency of bandwidth usage over the I.463 standard is achieved (in the context of the illustrative example set out above) by implementing a new rate adaptation scheme in which sub-rate data channels are assigned to an 8 Kbps fragment, or multiples thereof. For example, a 2.4 Kbps channel is assigned to an 8 Kbps envelope, 9.6 Kbps is assigned to two 8 Kbps envelopes, etc. Multiple envelopes (each 8 Kbps wide) are then multiplexed effecting a potential 8 fold improvement over existing methods and apparatus for implementing the I.463 standard. In the illustrative context, the key is to use the 8 Kbps granularity of the switch rather then the I.463 standard of assigning sub-rate data to a whole 64 Kbps slot.

Although definite improvements in the utilization of bandwidth and switching system granularity are made in the invention disclosed in the Improved I.463 Patent Application, it would be desirable if the individual channel carrying capacity of the system described therein could be improved as well. Such an improvement would result in the ability to take even greater advantage of the communication system's switching granularity and available bandwidth.

SUMMARY OF THE INVENTION

Accordingly, it is an object of the invention to improve the individual channel carrying capacity in a digital communication system.

It is a further object of the invention to perform sub-rate channel rate and adaptation in a way that improves available bandwidth usage when compared with the methods and apparatus taught in the Improved I.463 Patent Application.

It is still a further object of the invention to improve the use of fragment bandwidth per se by allowing a plurality of sub-rate channels to be carried within a given fragment. This degree of freedom provides the potential for improving bandwidth usage substantially in the communication system as a whole.

It is yet another object of the invention to effectively improve switching system granularity by matching granularity and fragment bandwidth, while at the same time permitting multiple sub-rate channels to be imbedded in a given fragment.

The ability to imbed a plurality of subrate channels in an envelope previously reserved for one sub-rate channel is referred to hereinafter as "time interleaved" rate adaptation. According to the invention, methods and apparatus are set forth which improve upon prior rate adaptation schemes by supporting time interleaved rate adaptaion.

In accordance with the preferred embodiment of the invention a program sequencer is used to perform rate adaptation as specified by a predefined time interleaved multiplexing scheme. The protocol for the predefined scheme is used by the sequencer to insert data bits from at least one active sub-rate channel into predetermined bit positions in a "t" bit frame.

In this manner a single level of rate adaptation can be used to support, for example, the insertion of three 2.4 Kbps channels into a single 8 Kbps channel. For this 2.4 Kbps example, a 24 fold improvement over the standard CCITT I.463 rate adaptation scheme, and a 3 fold improvement of the rate adaptation scheme taught in the Improved I.463 Patent Application, can be achieved.

The invention also contemplates performing the opposite of the time interleaved multiplexed rate adaptation function, referred to hereinafter as "time deinterleaving", in order to detect and extract any and all sub-rate channel data that may be imbedded in fragments received from the network.

These and other objects and features of the present invention, will be understood by those of ordinary skill in the art after referring to the detailed description of the preferred embodiment and the appended drawing.

DETAILED DESCRIPTION

Figure 1:
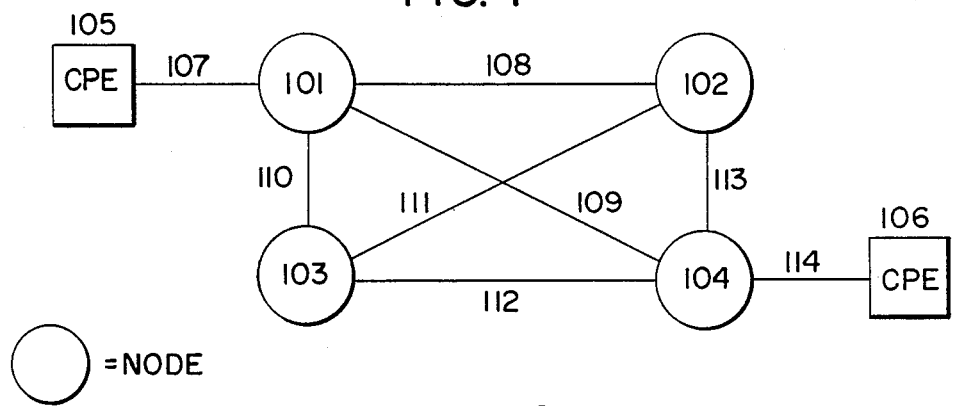
FIG. 1 (prior art) is a high-level functional representation of a typical digital data communication network comprising nodes interconnected by communication lines.

FIG. 1 depicts a typical network consisting of nodes 101, 102, 103, and 104 interconnected by communication lines. Some of the nodes are shown as having CPE equipment connected to them. (Node 101 is shown connected to CPE 105, and node 104 is shown connected to CPE 106.) In practice, any of the nodes may have CPE connected to them.

Figure 2:
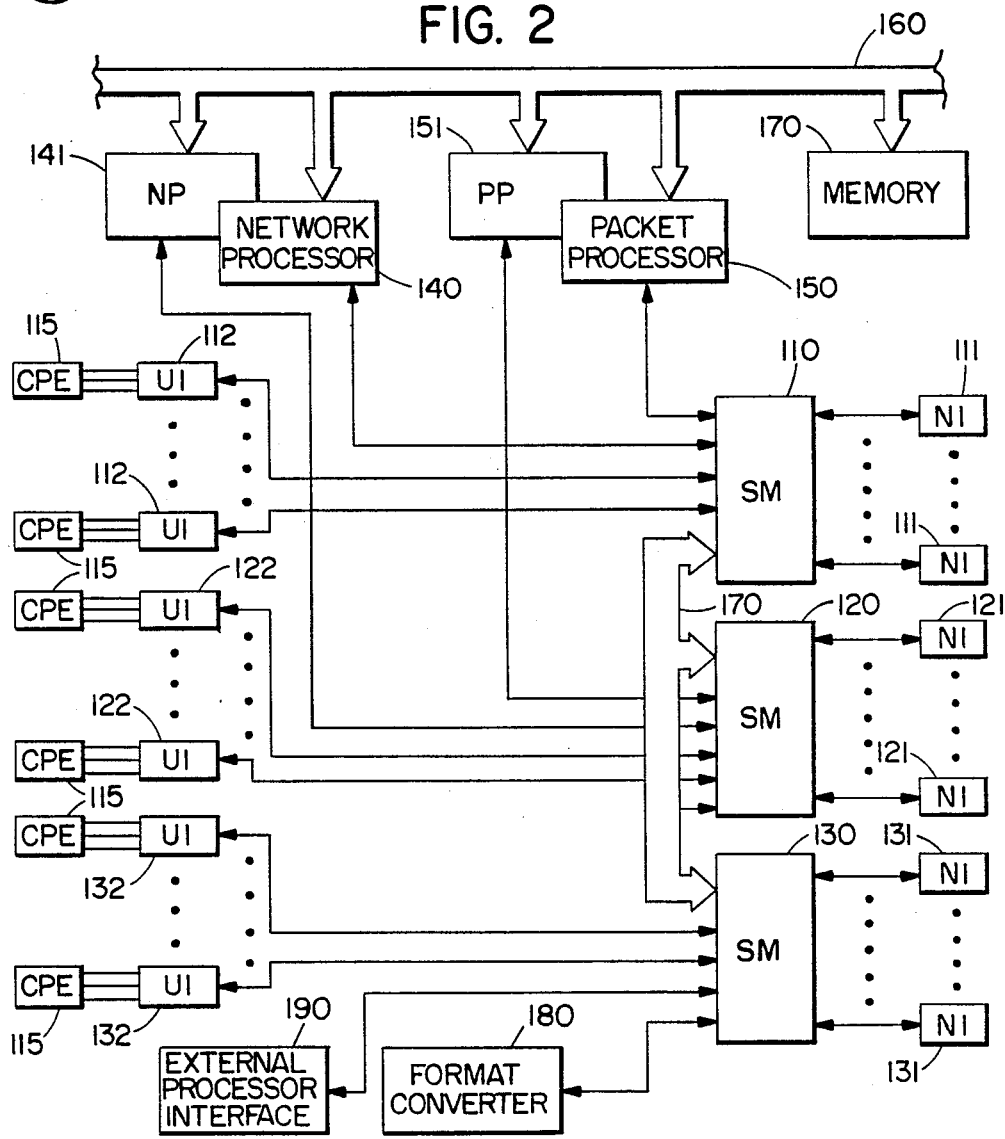
FIG. 2 is a block diagram of one such node showing a variety of communication paths both within and outside of a given node.

FIG. 2 shows internal detail of a typical node, comprising a wideband time-slot switch matrix (110, 120, 130) and a number of dual-ported network processors (140, 141) connected to each other via 2.048 Mbps serial links. These internal node paths are the IML links referred to hereinbefore. The switch matrix permits connectivity between the network processors, as well as connecting them to the network, via network interface (NI) means such as NI 111, and to local terminals, PCs and PBXs (labeled as CPE 115) via other similar serial links and devices such as user interface (UI) means 12.

Rate adaptation as contemplated by the CCITT I.463 standard, takes place at the UI level of the network. The prior art process is described hereinafter with reference to FIG. 5.

FIG. 2 also shows that each network processor is connected to a typical parallel computer bus 160. The network processors of the system can either be connected together with a single such bus, or in groups to more than one such bus. This way the necessary computing resources, such as memory 170, can be connected to the switch processors in a manner traditional to the computer industry.

The first network processor installed in the system is also programmed to control the switch matrix connections, such that when particular users in the network require access to a given network processor, that connection is carried out by the first network processor upon receiving a command from that specific user.

On the other hand, asynchronous network processor to network processor interconnectivity is achieved over the computer bus, such as is required when two such network processor units are sharing a single communications processing function such as packet switching. For example, a packet received by network processor 140 which was destined to network processor 141, if sharing the same bus, simply hands off such packet to network processor 141 using either DMA or a "mailslot" technique.

If a node that has been installed with N network processors is showing inadequate performance, or must then perform additional functionality, network processor N+1 is added. Furthermore, if the bus bandwidth is inadequate for all the functions being performed in a single-bus system, a second computer bus can be added to the system to separate into separate computing groups the functions that are not interrelated.

Figure 3:
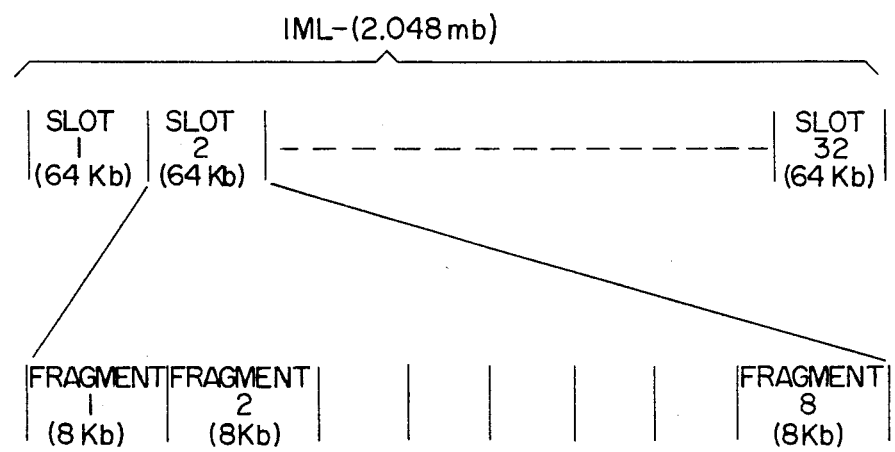
FIG. 3 depicts the allocation of a communication line into "slots" and "fragments".

FIG. 3 depicts the allocation of bandwidth of a 2.048 Mbps IML communication line in a switching system assumed, for the sake of illustration only, to have an 8 Kbps switching granularity. The available bandwidth is shown divided into thirty-two 64 Kbps slots. (32÷64 Kbps =2.048 Mbps). Each 64 Kbps slot is further divided into eight "fragments" of 8 Kbps each.

Not shown in FIG. 3, but contemplated by the invention, is a bandwidth allocation scheme for other data path frequencies, for example, T1 lines which could have twenty-four 64 Kbps slots, each with eight 8 Kbps fragments and a framing/signalling channel of 8 Kbps left over.

According to the invention, the ideal fragment bandwidth is the same as the maximum switching system granularity. Thus, for a switching system having a switching granularity of "x" bps, the ideal fragment width is also x bps. Dividing the fragment width into the frame bandwidth will indicate the number of fragments possible per frame. These can be grouped into slots such that each frame has an integral number of slots, m, where each slot has an integral number of fragments, n.

Returning to the illustrative example, as data begins flowing within a node (for the IML example) for transmission between devices within the node, a portion of the available bandwidth on a given link on which that data appears is inherently taken up by the data.

Bandwidth allocation may be accomplished, as taught in the referenced applications, using bit maps for each link connected within the node. The bit maps may be maintained by the network processor (NP) within a memory, such as memory 170. The bit map for each end of a link contains one bit position corresponding to each fragment of that link. Each bit position will contain a ONE to indicate that the corresponding fragment is in use and unavailable, or a ZERO to indicate that the corresponding fragment is available. The network processor can thus easily identify available fragments simply by searching through the bit map looking for ZERO bits. If more than one fragment is required, there is no necessity to assign contiguous fragments, as available fragments can be located anywhere in the link.

By adopting the convention that fragments will be allocated for transactions originating from one end of a link, from one end of the bit map, and for transactions originating at the other end of the same link, from the other end of the bit map, there is no need to pre-allocate to either, enabling the system to be more efficient when a preponderance of transactions is originating from one side or the other. The same type of allocation scheme will enhance performance of the internode T1 lines as well.

Figure 4:
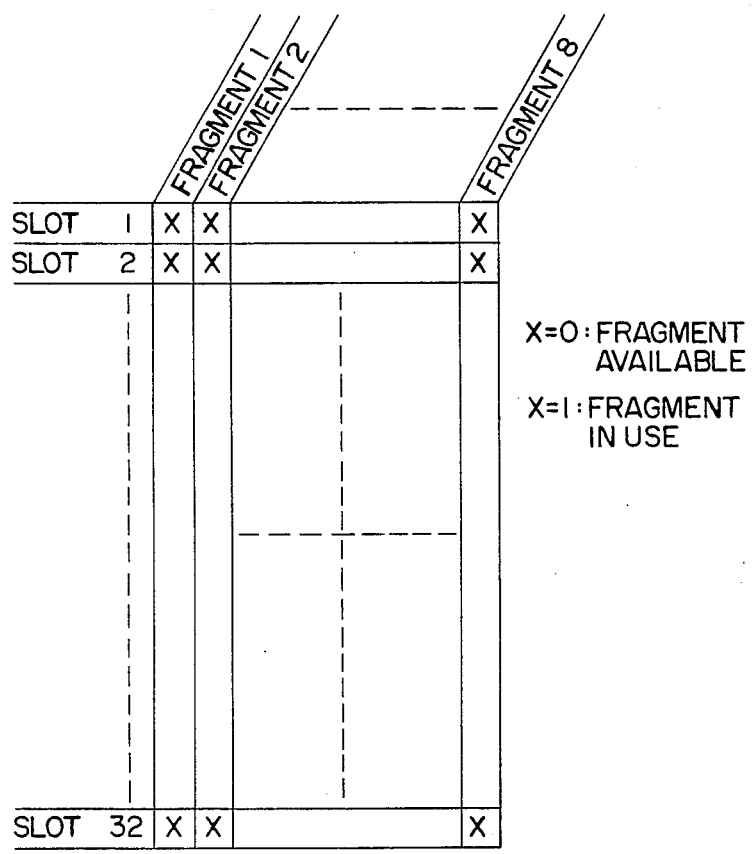
FIG. 4 depicts a bit map organization that is suitable for use with the present invention.

An example of a suitable bit map for a 32 slot per frame IML is delineated in FIG. 4. This can easily be modified to support 24 slot T1 lines, etc.

Figure 5:
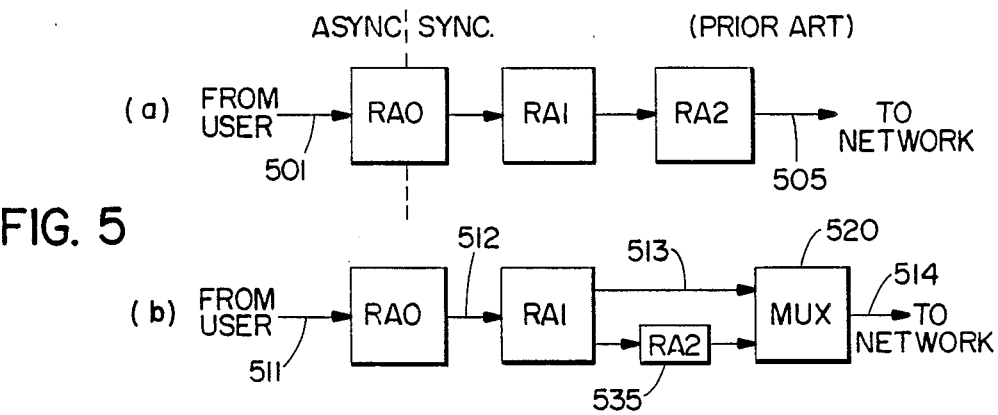
FIG. 5 depicts, in block diagram form, the prior art CCITT I.463 two level rate adaption scheme for inserting sub-rate channels into 64 Kbps slots compared with a rate adaptation scheme for inserting at least one sub-rate channel into an 8 Kbps slot.

Turning to FIG. 5, a comparison of the prior art rate adaptation scheme used to support I.463, is made against the rate adaption scheme for inserting at least one sub-rate channel into an 8 Kbps slot. Although well known to those skilled in the art, a brief review of the standard I.463 rate adaptation scheme will be explained for the sake of completeness.

CCITT I.463 implies two layers of synchronous rate adaptation. As illustrated by FIG. 5, sub-rate data, e.g., an asynchronous 2.4 Kbps signal, can be input via link 501 from CPE.

The input data is shown synchronized at RA0 in FIG. 5. Methods for synchronizing sub-rate data are well known by those skilled in the art by, for example, decoding framing bits in synchronized framing bit patterns. Accordingly, the synchronization shown in FIG. 5 does not constitute a part of the invention per se.

Once synchronized, CCITT I.463 calls for the performance of two layer rate adapation at RA1 and RA2 of FIG. 5 (prior art). At the first layer, RA1, sub-rate data is mapped into envelopes that are integer multiples of 8 Kbps wide. For example, the 2.4 Kbps signal would be "stuffed" into an 8 Kbps envelope, a 19.2 Kbps signal would be stuffed into a 32 Kbps envelope, etc., per this well known protocol.

The standard protocol goes on to call for a second level of rate adaptation where each set of envelopes corresponding to a given sub-rate channel signal, are in turn stuffed into a 64 Kbps slot for transmission to the switch matrix. This second level of rate adaptation is illustrated in FIG. 5 (prior art) at RA2. The output to the switch at 505 has individual sub-rate channels embedded in, and taking up, entire 64 Kbps slots.

Since the switch granularity of systems taught in the incorporated patent applications is better than 64 Kbps (8 Kbps for the illustrated example), the invention contemplates only 1 layer of rate adaptation as shown in the lower portion of FIG. 5. Thus sub-rate user inputs on link 511 can be output to the switch, via links 512, 513 and 514, via RA1 and MUX 520, without the second layer of rate adaptation called for in the I.463 standard. According to the invention, RA1 performs the same functions in both the prior art and new approach. RA2 can also be performed as an option for compatibility with other systems.

Also shown in FIG. 5, at 535, is the option, according to the invention, of performing yet another layer of rate adaptation depending on choice of fragment size and switch granularity. The illustrative embodiment of the invention with 8 Kbps fragments (envelopes) and an 8 Kbps granularity switch, does not require a second level of rate adaptation.

Before going on to the details of implementing the new rate adaptation scheme, described hereinafter with reference to FIG. 6, it will be useful to visualize the I.463 protocol as mandating that sub-rate data in the range of 600 baud to 19.2 Kbps, be inserted into 8 Kbps fragments by means of an 80-bit frame. Thus, for example, for a 2.4 Kbps signal, 24 data bits of sub-rate information need to be inserted into an 80 bit frame for the 8 Kbps operating rate. The other 56 bits of information in an 80 bit frame are filler bits.

It should be noted that the value of t, in a t bit frame, is directly related to fragment bandwidth. In particular, the relationship is (a) an n:1 correspondence between the total number of bits chosen for a t bit frame and the fragment bandwidth, where n is an integral sub-multiple of the fragment bandwidth in bits per second; and (b) the number of sub-rate data bits in a t bit frame must be chosen to be an integral number of bits within each t bit frame.

Thus, for example, given a fragment size (bandwidth) of 8 kbps, the number of bits in a t bit frame is determined by assigning to each bit a predetermined amount of fragment bandwidth. If one chooses to assign 100 bits per second of fragment bandwidth to each bit in the t bit frame, then n would equal 100, and t would equal 80. Clearly, the first constraint mentioned hereinabove is satisfied in that an integral sub-multiple of the fragment bandwidth (100 bits/sec.) for each bit in a t bit frame (80 bits) would exist for each 8 kbps fragment.

It should be noted that the second constraint recited hereinbefore, i.e., that the sub-rate channel fit into an integral number of bits within a t bit frame, is also satisfied when n equals 100 (i.e., when t=80). In particular, a 2.4 kbps sub-rate channel would fit into 24 bits of the 80 bit frame, a 4.8 kbps sub-rate channel would fit into 48 bits of the 80 bit frame, etc.

The invention contemplates the use of what will be referred to hereinafter as an "I.463 Plus" protocol. This protocol specifies that multiple sub-rate channels be inserted into a given fragment. Thus, for the sake of illustration only, three 2.4 kbps channels can be inserted into one 8 kbps fragment, i.e., 72 data bits of sub-rate data (from 3 separate channels) are inserted into the above defined 80 bit frame.

At initialization, a program sequencer can be easily set up to map multiple sub-rate channel data bits into any desired location in the aforesaid frame. Also, such a sequencer can be used to reverse the process, i.e., extract sub-rate information.

The ability to perform these functions using well known program sequencers and mapping techniques will add to the understanding of the illustrative embodiment of the invention to be described immediately hereinafter with reference to FIG. 6.

Figure 6:
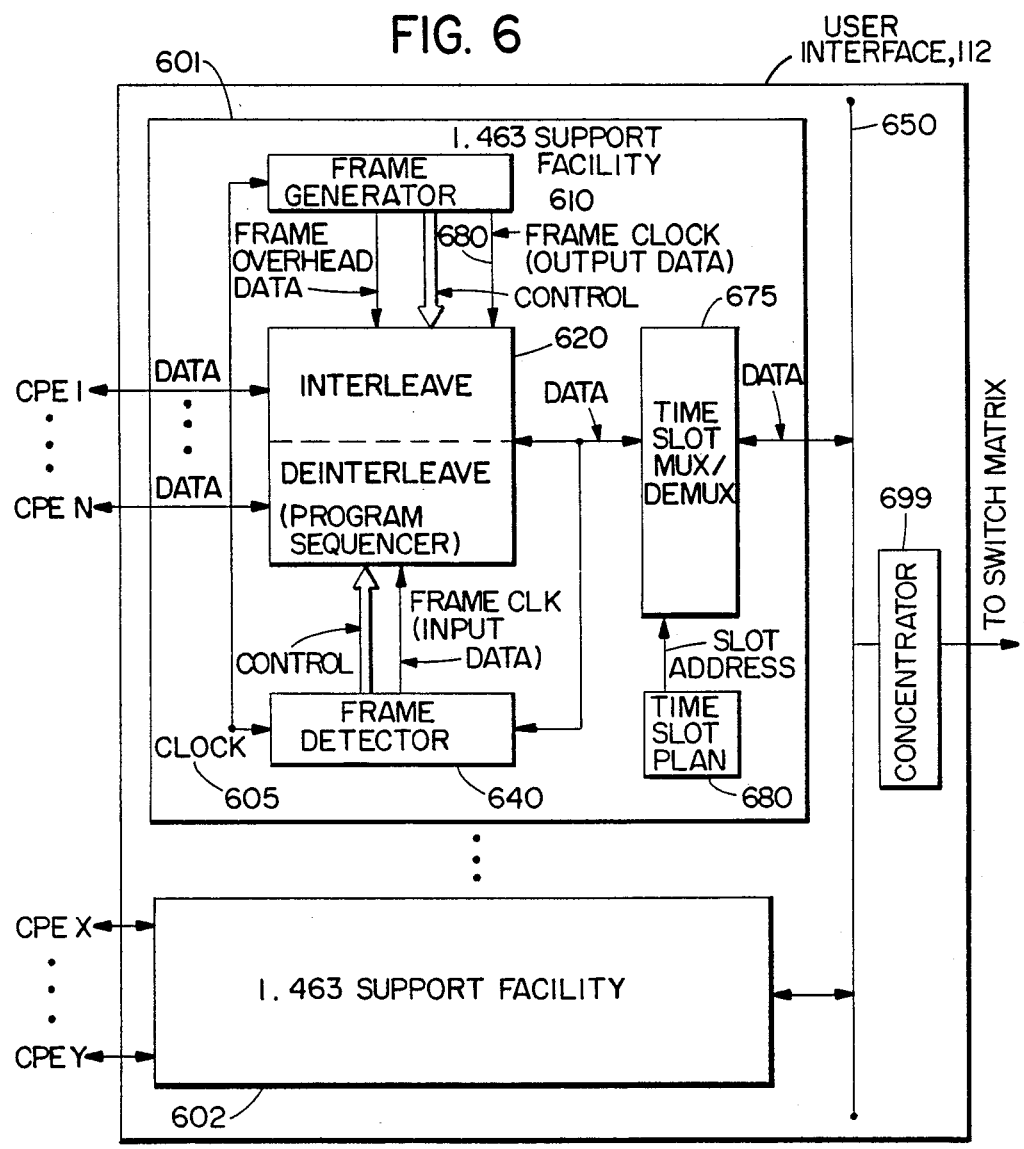
FIG. 6 depicts a functional block diagram for a user interface that supports the improved rate adaption scheme contemplated by the invention.

FIG. 6 depicts a typical user interface, such as UI 112 of FIG. 2.

The I.463 Plus support facility for a bank of CPE (e.g. CPE 1-N) is shown in FIG. 6 as block 601. Multiple I.463 Plus support facility can be located at a UI, as illustrated by block 602 which is intended to perform the same function as block 601.

A frame generator, such as device 610 of FIG. 6, is a device well known by those skilled in the art for generating framing information and does not constitute a part of the invention per se.

To support the I.463 Plus protocol, frame generator 610 generates a frame clock (for outputting data) for the 80 bit frames referred to hereinbefore. Frame Generator 610 is driven off of clock 605, and outputs not only the frame clock for data output (on link 680), but also control information and frame overhead data, for use by a program sequencer such as program sequencer 620.

Program sequencer 620 is depicted in FIG. 6 as having two portions, an interleave portion and a deinterleave portion.

The program sequencer can be realized by a microprocessor that is initialized to direct sub-rate channel data from one or more such channels into prespecified bit postions in each 80 bit frame (for interleaving). The same sequencer can be used to extract sub-rate data in each frame for data destined to the CPE side of the network (via the deinterleaver).

The deinterleave portion of program sequencer 620 is shown operating in conjunction with frame detector 640, a device that is also well known to those skilled in the art. Frame detector 640 determines frame boundries and enables program sequencer 620 to appropriately remove sub-rate information from a given frame. Control and frame clock (for input data) signals are depicted in FIG. 6 as input to program sequencer 620, from frame detector 640.

The combination of devices 610, 620 and 640 are all that is necessary to perform both the desired interleaving and deinterleaving in support of any desired protocol and particularly the I.463 protocol sought to be more efficiently supported by the invention.

FIG. 6 also indicates how the output of the sequencer, destined for the switch, can be multiplexed onto an internal UI bus, e.g., bus 650, via mux/demux device 675, in accordance with a time slot plan stored at device 680 which could be realized by RAM.

UI bus 650 is shown taking output from (and also distributing data to) a plurality of banks of CPE, and interfacing with IMLs to the switch via concentrator 699.

What has been described ia a rate adaptation scheme that meets all of the objectives set forth hereinbefore. Those skilled in the art will recognize that the foregoing description of a preferred embodiment of the novel methods and apparatus has been presented for the purposes of illustration and description only. It is not intended to be exhaustive or to limit the invention to the precise form disclosed, and obviously many modifications and variations are possible in light of the above teaching.

The embodiment and examples set forth herein were presented in order to best explain the principles of the instant invention and its practical application to thereby enable others skilled in the art to best utilize the instant invention in various embodiments and with various modifications as are suited to the particular use contemplated.

It is intended that the scope of the instant invention be defined by the claims appended hereto:

What is claimed is:

1. A method for performing time interleaved multiplexing of a plurality of active sub-rate channels, in accordance with a predefined time interleaved multiplexing protocol, on a data path in a digital communication switching system that has a switching granularity of "x" bits per second, wherein said data path has a bandwidth divided into "m" slots, the slots each being further subdivided into "n" fragments, comprising the steps of:
    (a) inputting said plurality of active sub-rate channels into means capable of performing single step rate adaptation, wherein said means for performing rate adaptation is operative to insert data bits from each of said channels into successive, equal width "t" bit frames utilizing only a single level of framing, in accordance with said time interleaved multiplexing protocol, effectively multiplexing said channels in a given fragment up to the fragment's bandwidth;
    (b) creating each of said t bit frames utilizing frame generator means, such that each bit in a t bit frame corresponds to a channel carrying capacity that can be expressed as an integral number of bits per second;
    (c) interleaving the sub-rate data into the proper position in each of said t bit frames as defined by said time interleaved multiplexing protocol;
    (d) inserting filler bits into the remaining bit positions of each of said t bit frames; and
    (e) outputting the successive t bit frames for transmission through the switching system.

2. A method as set forth in claim 1 further comprising the step of initializing a program sequencer, coupled to said frame generator means, by loading into said sequencer a map indicating the proper place to insert multiple sub-rate channel data bits in each frame, in accordance with said time interleaved multiplexing protocol.

3. A method as set forth in claim 1 wherein the value of t is directly related to the bandwidth of a fragment which in turn is directly related to the granularity, x bits per second, of the switching system to thereby permit sub-rate channel data to be switched to take advantage of switching granularity.

4. A method as set forth in claim 1 further comprising the steps of:
    (f) receiving sub-rate channel data from a system user; and
    (g) synchronizing any asynchronous data received prior to performing said step of inputting.

5. A method as set forth in claim 1 further comprising the step of optionally performing at least one further level of rate adaptation.

6. A method as set forth in claim 1 wherein said filler bits include framing bits.

7. Apparatus for multiplexing a plurality of sub-rate channels, in accordance with a predefined time interleaved multiplexing protocol, in a digital switching system having a plurality of system users operating at sub-rate frequencies and having a switching granularity of "x" bits per second, comprising:
    (a) means for receiving channel data from said system user; and (b) means, coupled to said means for receiving, for performing a single level of rate adaptation on received data to insert synchronized sub-rate channel data into t bit frames that are integral sub-multiples of x bits per second.

8. Apparatus for performing time interleaved multiplexing of sub-rate channels in accordance with a predefined time interleaved multiplexing protocol, in a digital switching system having a plurality of system users operating at sub-rate frequencies and having a switching granularity of "x" bits per second, comprising:

(a) means for generating a clock signal;
(b) means for receiving sub-rate channel data from said system users;
(c) means for synchronizing any received asynchronous sub-rate channel data in relation to said clock signal; and
(d) means for performing a single level of rate adaptation, utilizing only a single level of framing, to insert synchronized sub-rate channel data from a plurality of sub-rate channels into t bit frames that are integral sub-multiples of x bits per second.

9. Apparatus as set forth in claim 8 wherein said means for performing rate adaptation further comprises:

(c) frame generator means, operative in response to said clock signal, for generating t bit frames in accordance with a predefined time interleaved multiplexing protocol; and
(d) means, coupled to said frame generator means, for time interleaving multiple sub-rate channel data into predetermined bit positions in each t bit time frame in accordance with said time interleaved multiplexing protocol.

10. Apparatus as set forth in claim 9 wherein said means for interleaving is a program sequencer.

11. Apparatus as set forth in claim 9 wherein said means for interleaving further comprises means for optionally performing at least one additional level of rate adaptation.

12. Apparatus as set forth in claim 10 wherein said means for performing rate adaptation further comprises:

(e) frame detector means, operative in response to said clock signal, for identifying the boundry of each of said t bit frames in, accordance with a predefined time interleaved demultiplexing protocol; and
(f) means, coupled to said frame detector means, for deinterleaving multiple sub-rate channel data from predetermined bit positions in said t bit frames.

* * * * *